United States Patent
He

(10) Patent No.: US 8,445,828 B2
(45) Date of Patent: May 21, 2013

(54) HIGH DYNAMIC RANGE IMAGE SENSOR WITH IN PIXEL MEMORY

(75) Inventor: Xinping He, Saratoga, CA (US)

(73) Assignee: Silicon Optronics, Inc.

( * ) Notice: Subject to any disclaimer, the term of this patent is extended or adjusted under 35 U.S.C. 154(b) by 326 days.

(21) Appl. No.: 12/828,702

(22) Filed: Jul. 1, 2010

(65) Prior Publication Data

US 2012/0001060 A1    Jan. 5, 2012

(51) Int. Cl.
*H01L 27/00*    (2006.01)

(52) U.S. Cl.
USPC ............... 250/208.1; 250/214 R; 348/297; 348/308

(58) Field of Classification Search
USPC ............ 250/208.1, 214 R, 214 SW; 348/294, 348/297, 307, 308
See application file for complete search history.

(56) References Cited

U.S. PATENT DOCUMENTS

| | | | |
|---|---|---|---|
| 5,056,064 A | 10/1991 | Iwahashi et al. | |
| 5,541,654 A | 7/1996 | Roberts | |
| 5,565,915 A * | 10/1996 | Kindo et al. | 348/308 |
| 5,935,236 A | 8/1999 | Wakimoto | |
| 6,960,757 B2 | 11/2005 | Merrill et al. | |
| 7,764,396 B2 * | 7/2010 | Yu | 358/1.2 |
| 2003/0137594 A1 | 7/2003 | Koizumi et al. | |
| 2005/0068838 A1 | 3/2005 | Kono et al. | |
| 2007/0189071 A1 | 8/2007 | Vali et al. | |
| 2008/0043128 A1 | 2/2008 | Poonnen et al. | |
| 2008/0246869 A1 | 10/2008 | Krymski | |

OTHER PUBLICATIONS

International Search Report and Written Opinion for International Patent Application No. PCT/US2011/040542, Applicant: Nueva Imaging, mailed Oct. 4, 2011, 8 pages.

\* cited by examiner

*Primary Examiner* — Kevin Pyo
(74) *Attorney, Agent, or Firm* — Perkins Coie LLP

(57) ABSTRACT

A high dynamic range CMOS image sensor is disclosed. The pixels of the image sensor incorporate in-pixel memory. Further, the pixels may have varying integration periods. The integration periods are determined, in part, by the signal stored in the in-pixel memory from previous integration periods.

18 Claims, 6 Drawing Sheets

HIGH DYNAMIC RANGE IMAGE SENSOR WITH IN PIXEL MEMORY

TECHNICAL FIELD

The present disclosure relates to CMOS image sensors, and more particularly, to an image sensor with high dynamic range using pixels with variable reset times and pixel memory.

BACKGROUND

One of the challenges in designing an image sensor is the need for the image sensor to exhibit a high dynamic range. Many applications, particularly outdoor applications, require the image sensor to have a high dynamic range to account for very bright and very dark areas. For example, some applications may have lighting conditions from below 1 lux for night vision to over 10,000 lux for bright sunlight. Real world scenes may have illumination intensities varying over a 100 dB range or more. While biological vision systems and silver halide film can image high dynamic range (100+dB) scenes with little loss of contrast information, it has been challenging to develop electronic image sensors to do the same.

Most current image sensors have limited dynamic ranges, typically between 50 dB to 80 dB. Because of this, relevant information content is lost of the captured scene. Thus, it is desirable to have high dynamic range (HDR) image sensor that can more accurately capture the scene.

The large variation of illumination intensity manifests itself in image blooming when these prior art sensors are used to capture a scene with a very bright area. The pixels illuminated by the very bright light source saturate and flood signal onto adjacent pixels so that the bright areas of the output image grow and the true image is lost.

Prior art attempts to increase dynamic range for CMOS image sensors include:
1. Measurement of the number of clock periods to reach a threshold. See, e.g., U.S. Pat. No. 5,650,643 to Konuma.
2. Capture of two or more correlated images with different integration times and then combining the multiple images into a single high dynamic range image. See, e.g., Orly Yadid-Pecht et al. "Wide Intrascene Dynamic Range CMOS APS Using Dual Sampling", 1997 IEEE Workshop on Charge-Coupled Device and Advanced Image Sensors and D. X. D. Yang et al. "A 640×512 CMOS Image Sensor with Ultra Wide Dynamic Range Floating Point Pixel Level ADC," ISSCC Digest of Technical Papers, February 1999.
3. Logarithmic transfer function pixel architectures. See, e.g., S. Kavadias et al. "A logarithmic response CMOS image sensor with on-chip calibration", IEEE J. Solid State Circuits, Vol. 35, No. 8, August 2000.
4. Varying the level of the reset gate during integration. The current to charge transfer function is compressed resulting in higher maximum non-saturation current. See, e.g., U.S. Pat. No. 5,055,667 to Sayag and S. J. Decker et al. "A 256×256 CMOS Imaging Array with Wide Dynamic Range Pixels and Column-Parallel Digital Output", IEEE J. Solid State Circuits, Vol. 33, pp. 2081-2091, December 1998.
5. Spatially varying the exposure:
   a. An array of neutral density filters is deposited on the sensor so that pixels with darker filters sample high intensity light while pixels with lighter filters sample low intensity light. High dynamic range image is synthesized using low pass filtering or more sophisticated techniques such as cubic interpolation. See e.g., U.S. Pat. No. 6,864,916 to Nayer.
   b. Individually resetting the pixels. See, e.g., U.S. Pat. No. 5,892,541 to Merrill and U.S. Pat. No. 6,175,383 to Orly Yadid-Pecht et al.

The '383 patent merits additional discussion. As seen in FIG. 1 (a reproduction of FIG. 3 of the '383 patent), the '383 patent implements individual pixel reset with one additional transistor compared to a conventional 3T APS design. The pixels can be reset at different times, but sampling is accomplished at the sample time for all pixels. The time (integration period) between reset time and sample time will vary as desired for each pixel by varying the reset time for each pixel.

As seen in FIG. 1, the '383 patent also teaches non-destructive readout by activating the row select transistor 56 and reading the voltage on the column bus 60. Nondestructive readout can be used to determine the optimum exposure period for a given region of interest.

In operation, when both the row reset line RRST and the column reset line CRST 52 are simultaneously high, the logic reset transistor 48 will turn on and node LRST 50 will be high and the pixel will be reset. Otherwise, the row reset transistor 48 passes a low voltage which does not activate the logical reset transistor. Column reset line 52 is shared with pixels in the same column. Turning to FIG. 2 (a reproduction of FIG. 5 of the '383 patent), the '383 patent shows that by varying the reset time of individual pixels, integration times of T, T1, T2, or T3 can be implemented. Note that each pixel does not include memory and reset times for the pixels must be determined by peripheral processing circuitry.

While this prior art approach is advantageous over other techniques, it still does not provide completely satisfactory performance.

BRIEF DESCRIPTION OF THE DRAWINGS

The present invention is illustrated in an exemplary manner by the accompanying drawings. The drawings should be understood as exemplary rather than limiting, as the scope of the invention is defined by the claims.

DETAILED DESCRIPTION

In the description that follows, the scope of the term "an embodiment" is not to be limited as to mean more than one embodiment, bur rather, the scope may include one embodiment, more than one embodiment, or perhaps all embodiments.

As will be detailed further below, the disclosed embodiments extend the dynamic range of an image sensor by controlling the exposure time of each pixel individually. Further, the disclosed embodiments have a "memory cell" in each pixel. The photo sensor is connected to a drain before exposure starts.

Moreover, the disclosed embodiments have the capability to run the image sensor at a high frame rate. Further, the image sensor uses information from the previous frame or frames to anticipate the exposure time for the current frame.

Figure 1:
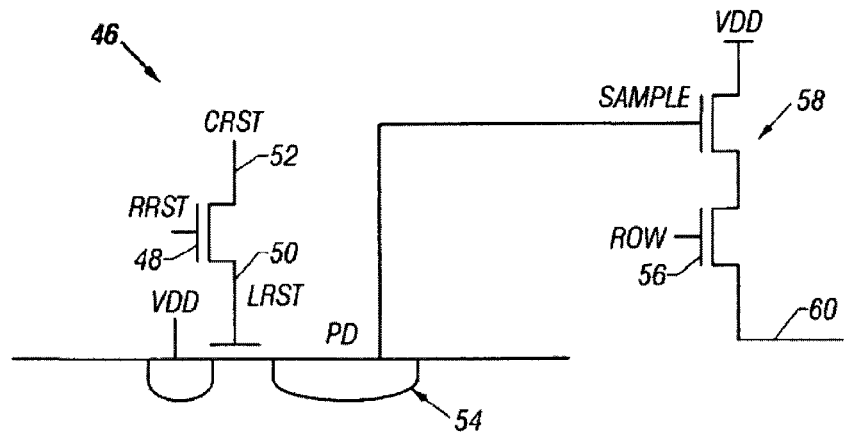
FIG. 1 is a prior art pixel design using four transistors.
Figure 2:
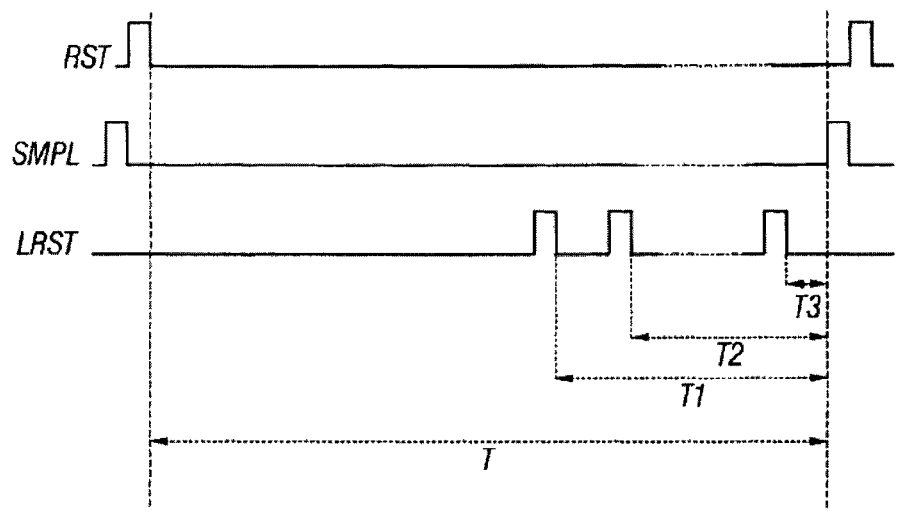
FIG. 2 is a prior art timing diagram for the pixel of FIG. 1.
Figure 3:
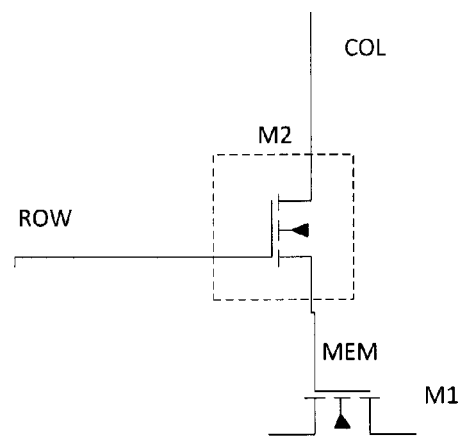
FIG. 3 is a memory latch circuit utilized in the pixels in accordance with a disclosed embodiment.

FIG. 3 shows a memory latch circuit that is incorporated into the pixels of the disclosed image sensor. The memory latch circuit performs a latch function. It includes a switch transistor M1, a latch transistor M2, and memory node MEM. The inherent parasitic capacitors, gate capacitance of the switch transistor M1, and PN junction capacitance the source of latch transistor M2, is used as a storage device to store a logic high or low signal. The gate of the latch transistor M2 is connected to row reset line ROW. The drain of the latch transistor M2 is connected to column reset line COL. The source of the latch transistor M2 is connected to memory node MEM.

Figure 4:
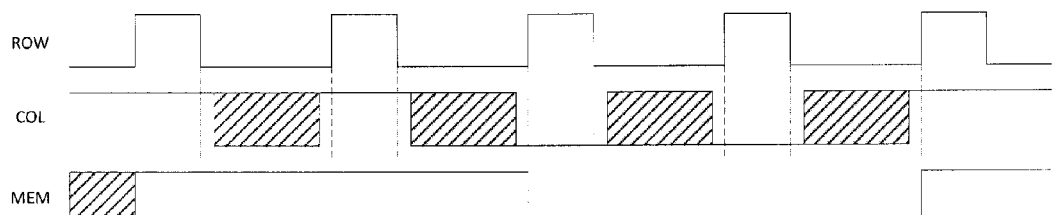
FIG. 4 is a timing diagram showing the operation of the memory latch circuit of FIG. 3.

FIG. 4 shows the timing diagram to achieve the latch function. In FIG. 4, the ROW signal is pulsed. At the first pulse, the signal on line COL is placed onto the memory node MEM. At the falling edge of the first pulse on the ROW line, this shuts off transistor M2 and causes the signal to be stored on the memory node MEM. To minimize the impact to the photodiode, in one embodiment, the logic value placed on line COL is ready (i.e. stable) before the logic value of ROW goes to high and the value is held until after the ROW goes to low.

The logic value of COL will not affect the logic value stored in memory node MEM, since the signal on ROW is low. Note that in FIG. 4, the hatched area of the drawing indicates an indeterminate or irrelevant signal. In FIG. 4, if the signal on COL is high, the memory node will be high after the ROW line pulses a high signal. If the signal on COL is low (seen at the beginning of the third ROW pulse), then the memory node MEM will be low. Finally, just prior to the last ROW pulse, the COL signal becomes high, and the memory node MEM becomes high again. In this manner, FIG. 3 operates as a storage device storing a signal placed on the column reset line COL. Storage is initiated by the row reset line ROW.

Figure 5:
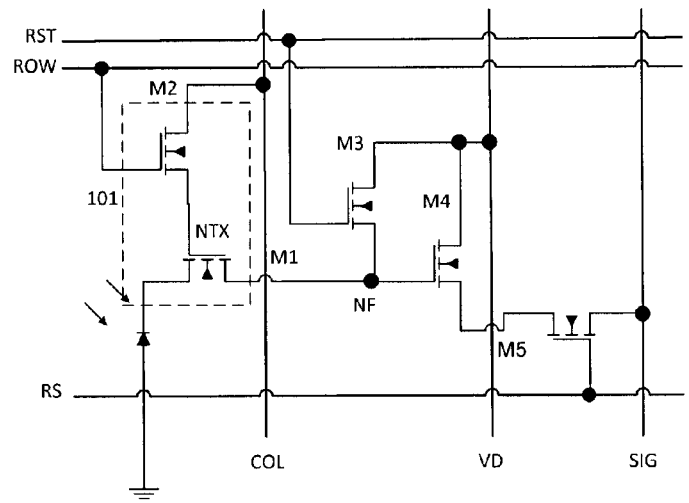
FIG. 5 is a circuit diagram of a pixel in accordance with a disclosed embodiment.

FIG. 5 shows the full pixel circuitry capable of individual pixel reset and in-pixel memory. A single pixel is shown, which incorporates the latching function of transistors M1 and M2 of FIG. 3. In FIG. 5, the memory node is designated as NTX. M1 is the transfer gate between the photodiode and the gate of source follower M4. Note that a photodiode is shown in FIG. 5, but it can be appreciated that other types of light sensing devices can be easily substituted for the photodiode, such as a pinned photodiode, photogate, and the like. Thus, the term photodiode, as used herein and in the claims, shall mean any light sensing device that can convert incident light into an electrical signal.

M4 is a source follower that amplifies the signal on floating node NF when the signal on floating node NF is to be read out. M3 is the reset transistor to reset the floating node NF to a fixed voltage.

In general, row read out select transistor M5 is off, except when it is time to read out the row of pixels, at which time it is turned on. Thus, select transistor M5 isolates the pixel to the column signal bus SIG.

The gate of reset transistor M3 is connected to row bus RST. Both drains of reset transistor M3 and source follower M4 are connected to a line VD, typically a power supply line in most cases that has voltage VD. The gate of latch transistor M2 is connected to row reset line ROW and its drain is connected to column reset line COL. Row bus RST is always active except when the row is selected for read out. The floating node NF is connected to line VD when the row is not selected for read out (i.e. when row bus RST is high).

Alternatively, the floating node NF may be connected to a separate voltage supply reference and be controlled separately. In other words, the reset transistor M3 may have its drain connected not to line VD, but a separate line with a different voltage supply reference. This can be advantageous to control "dark current".

With the memory node NTX in the pixel design, a high voltage signal (from column reset line COL) is stored in NTX before integration of this pixel starts. This turns on the transfer transistor M1. Thus, the photodiode is connected to line VD carrying voltage VD, since row bus RST is high as well. The charge accumulated in this photodiode before integration starts will drain to line VD. Thus, prior to integration, the photodiode is "empty" because it can drain to line VD. This prevents blooming. In one respect, transistor M1 may also be thought of as a "reset" transistor, since if M1 is on, the photodiode is held to or reset to voltage VD on line VD.

The signal in memory node NTX switches to low (from the signal on column reset line COL) when integration of this pixel starts. When NTX switches to low, the photodiode is isolated from the floating node NF and line VD. The photodiode then begins to accumulate charge.

Figure 6:
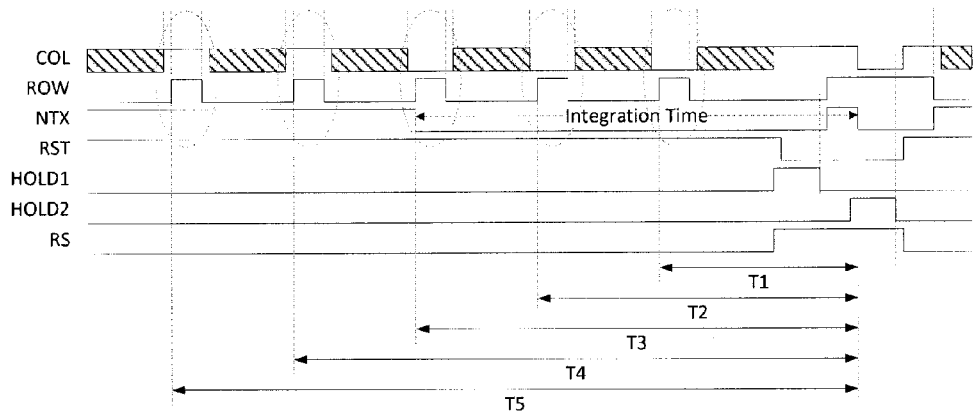
FIG. 6 is a timing diagram showing the operation of the pixel of FIG. 5.

Specifically, FIG. 6 shows the timing diagram assuming, as one example, that there are total 5 possible integration times for each pixel. Assume that the integration time for this pixel is T3. The column reset line COL is high when the row is selected for the pixels having integration time of T5 and T4. The memory node NTX is high before the third pulse on the ROW line. The photodiode is connected to a drain (line VD) and no charge can be accumulated in the diode, and there is no blooming. Just prior to the third pulse on the ROW line, the column reset line COL becomes low—this indicates that for this pixel, integration should begin. Because COL is low, the memory node NTX is low starting at the rising edge of the third pulse.

Because NTX carries a low signal, transfer gate M1 is off (isolating and shutting off the photodiode from line VD) and charge starts to accumulate in the photodiode. At the sample time, the ROW line and the COL line are both high, activating the transfer transistor M1. The RST line is low, which shuts off the reset transistor M3. The accumulated charge in the photodiode then moves to the floating node NF. The signal on node NF then is amplified by source follower M4, and read out when select transistor M5 is turned on by line RS.

As can be seen, by controlling the signal on the ROW and COL lines, the integration period for each pixel can be controlled, on a pixel by pixel basis. In practice, an entire row of pixels can have their integration times controlled at once, since each COL line addresses a single column of pixels. Note that there are two other signals shown: Hold1 and Hold2. These two signals are used in connection with correlated double sampling (CDS) circuitry in the column amplifier. The use of these two signals is conventional in the art, and in general, the signal line is sampled during reset and sampled during readout to eliminate fixed noise and kTC noise.

Figure 7:
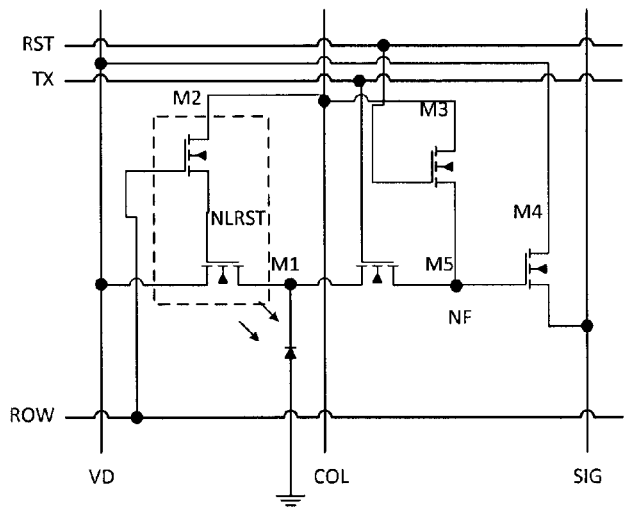
FIG. 7 is a circuit diagram of a pixel in accordance with another disclosed embodiment.

FIG. 7 is another embodiment of a pixel in accordance with this disclosure. The pixel is capable of individual pixel reset with in-pixel memory. The latch transistor M2 and switch M1 act as a lateral overflow drain in a photodiode pixel. The memory node NLRST is always high before the integration starts. The lateral overflow drain transistor M1 is on so to connect photodiode to a line VD, carrying voltage VD. Thus, the photodiode is "empty" prior to integration, and there is no blooming before integration. Unlike the embodiment shown in FIG. 5, the photodiode signal transfer transistor M5 of FIG. 7 is controlled by a dedicated line TX, and not by the combination of COL and ROW.

Figure 8:
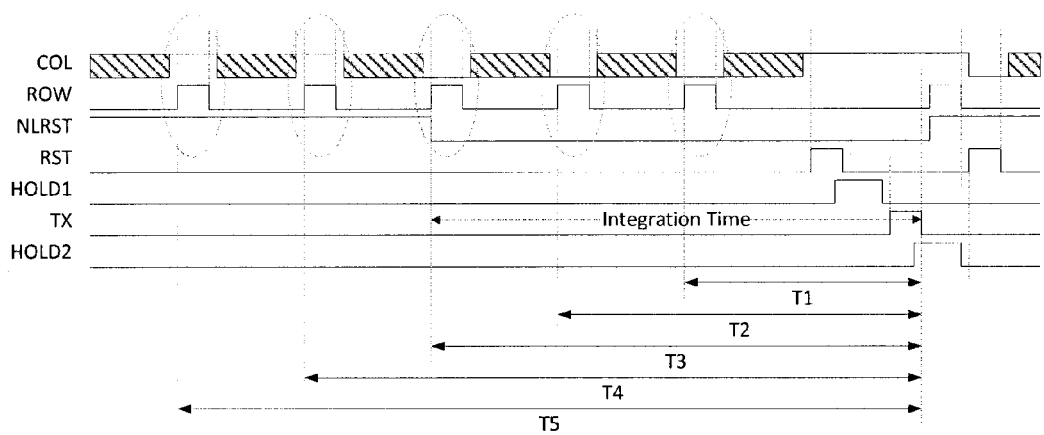
FIG. 8 is a timing diagram showing the operation of the pixel of FIG. 7.

FIG. 8 shows the timing diagram illustrating the operation of the pixel of FIG. 7. Assume again that this particular pixel has an integration time of T3. Just prior to the third pulse on the ROW line, the COL line for this pixel goes low. This causes a low signal to be stored at memory node NLRST, which causes the photodiode to be isolated from the line VD. Prior to integration, the node NLRST has stored the high signal from the COL line—which turns on the transistor M1 and connects the photodiode to VD. After the integration time period begins with COL line turning low, the photodiode is isolated and can begin accumulating charge. At readout time, line TX goes high and turns on photodiode signal transfer transistor M5, allowing the charge accumulated in photodiode to go to floating node NF. Note that just prior to readout, floating node NF is reset by turning on reset transistor M3 by placing a high signal on line RST. The signal on node NF then is amplified by source follower M4, and read out onto line SIG.

In practicality, the number of possible integration periods in every frame is limited to a certain number. It may be advantageous to have the number of integration periods by a number such as 2, 4, 8, or 16. As can be seen, all numbers are powers of 2 and depend on how many bits will be used to represent the integration period. In implementation, a table of N possible integration periods covers all possible exposure times for each pixel. Each pixel has an index n (n is between 1 and N) representing the exposure time. The actual exposure time can be found in the exposure time table. The exposure time of each pixel is determined by, for example, reviewing previous frame or frames and the projected signal at the end of integration is below the saturation level.

Figure 9:
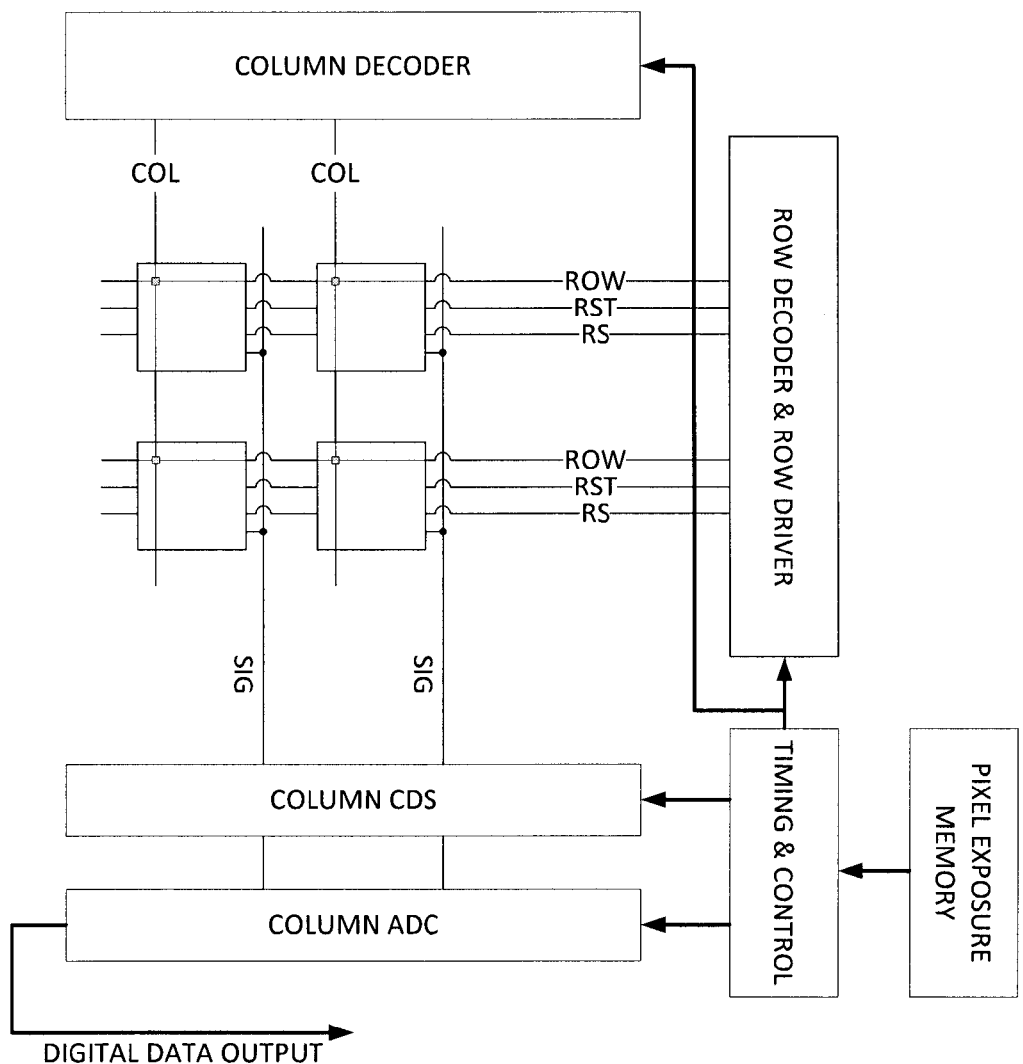
FIG. 9 is a block diagram of readout circuitry used in reading out the pixels of FIG. 5.
Figure 10:
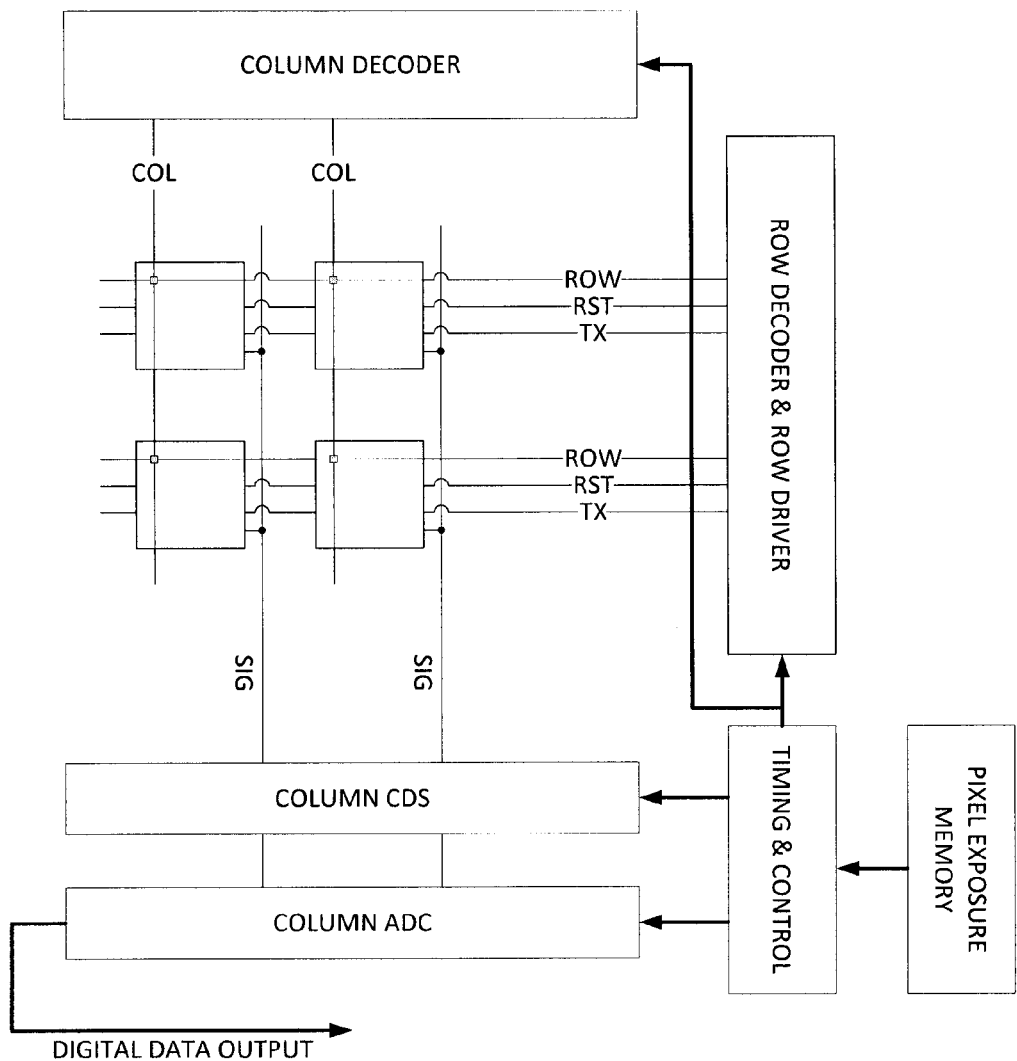
FIG. 10 is a block diagram of readout circuitry used in reading out the pixels of FIG. 7.

Those of ordinary skill in the art will recognize that peripheral control circuitry is utilized to send the appropriate timing signals and high/low signals onto the lines. An example architecture for the pixel of FIG. 5 is shown in FIG. 9. Timing and control circuitry is connected to the pixel exposure memory. The pixel exposure memory identifies areas of an image from a previous frame or frames that exhibit either saturation or low light levels. Based upon this information, the integration periods of the affected pixels are adjusted up or down to increase dynamic range. The timing and control circuitry provides control signals to the row decoder and row driver circuit, the column correlated double sampling (CDS) and column analog to digital converter, and to the column decoder. The signals implement the reset, readout, and integration time functions of each pixel. FIG. 10 shows similar circuitry for the pixel of FIG. 7. Note that the memory and control circuitry may be on the same chip as the image sensor or on a separate chip.

Features and aspects of various embodiments may be integrated into other embodiments, and embodiments illustrated in this document may be implemented without all of the features or aspects illustrated or described. One skilled in the art will appreciate that although specific examples and embodiments of the system and methods have been described for purposes of illustration, various modifications can be made without deviating from the spirit and scope of the present invention. For example, embodiments of the present invention may be applied to image sensors having different types of light sensing devices, such as photodiodes, photogates, pinned photodiodes, and equivalents. Moreover, features of one embodiment may be incorporated into other embodiments, even where those features are not described together in a single embodiment within the present document. Accordingly, the invention is described by the appended claims.

I claim:

1. A pixel for an image sensor comprising:
   a photodiode;
   a memory latch circuit located within the pixel and controlled by a row line and a column line, the memory latch circuit latching and storing a control signal in a memory node, the control signal controlling the integration period of the photodiode;
   a source follower transistor that receives a photodiode signal from the photodiode and amplifies the photodiode signal for readout onto a signal line.

2. The pixel of claim 1 wherein the readout onto the signal line is through a readout row select transistor.

3. The pixel of claim 1 wherein said photodiode signal is placed onto a floating node that is connected to the gate of the source follower transistor.

4. The pixel of claim 1 wherein said floating node is reset using a reset transistor controlled by a reset line, and the floating node is reset to a voltage VD carried on a line VD.

5. The pixel of claim 1 wherein the memory latch circuit comprises
   a row select transistor controlled by the row line; and
   a transfer transistor between the photodiode and the floating node, the transfer transistor controlled by the control signal.

6. The pixel of claim 1 wherein the control signal starts the integration period of the photodiode.

7. The pixel of claim 1 wherein the control signal is carried by the column line, and where the control signal is stable prior to and after when the row line is pulsed.

8. The pixel of claim 1 wherein when said photodiode is not in the integration period, the photodiode signal discharges to a drain line.

9. The pixel of claim 8 wherein the drain line is a line VD.

10. The pixel of claim 1 wherein said photodiode is a pinned photodiode.

11. A pixel for an image sensor comprising:
    a photodiode;
    a memory latch circuit located within the pixel and controlled by a row line and a column line, the memory latch circuit latching and storing a control signal on a memory node, the control signal controlling the integration period of the photodiode;
    a transfer transistor between the photodiode and a floating node;
    a source follower transistor that receives a photodiode signal from the photodiode, after being transferred by the transfer transistor, the source follower transistor amplifying the photodiode signal for readout onto a signal line.

12. The pixel of claim 11 wherein said floating node is reset using a reset transistor controlled by a reset line.

13. The pixel of claim 11 wherein the memory latch circuit comprises
    a row select transistor controlled by the row line; and
    a lateral overflow drain transistor between the photodiode and a line VD, the lateral overflow drain transistor controlled by the control signal.

14. The pixel of claim 11 wherein the control signal starts the integration period of the photodiode.

15. The pixel of claim 11 wherein said photodiode is a pinned photodiode.

16. The pixel of claim 11 wherein the control signal is carried by the column line, and where the control signal is stable prior to and after when the row line is pulsed.

17. The pixel of claim 11 wherein when said photodiode is not in the integration period, the photodiode signal discharges to a drain line.

18. The pixel of claim 17 wherein the drain line is a line VD.

\* \* \* \* \*